Dec. 31, 1968   W. B. GOODALE   3,418,677
WINDSHIELD WIPER CLOSURE CONTROL SYSTEM
Filed Feb. 23, 1967   Sheet 1 of 2

INVENTOR
WILLIAM B. GOODALE
BY John R. Faulkner
E. Dennis O'Connor
ATTORNEYS

Dec. 31, 1968   W. B. GOODALE   3,418,677
WINDSHIELD WIPER CLOSURE CONTROL SYSTEM
Filed Feb. 23, 1967   Sheet 2 of 2
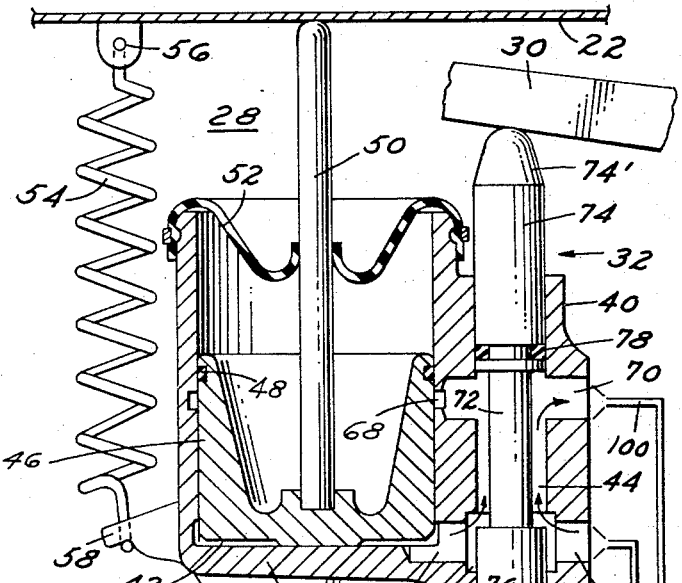
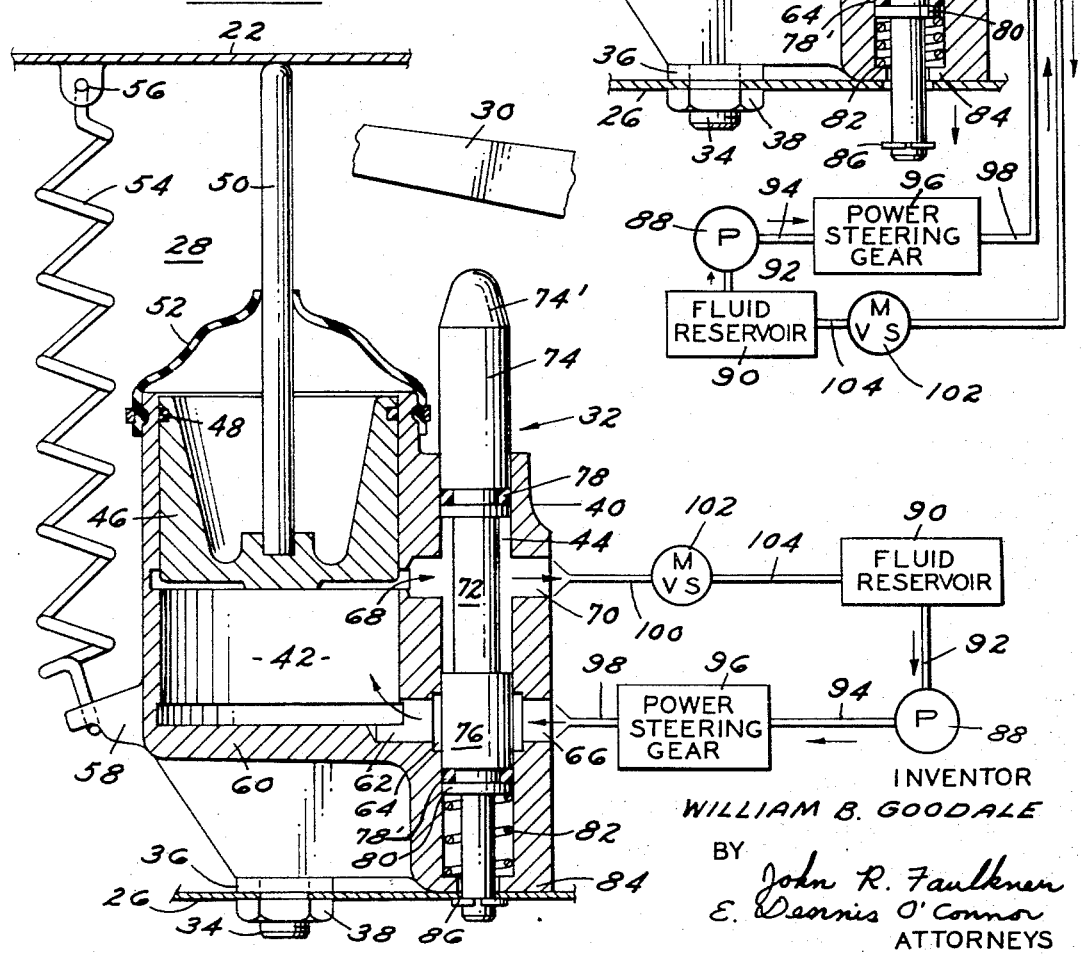
INVENTOR
WILLIAM B. GOODALE
BY
John R. Faulkner
E. Dennis O'Connor
ATTORNEYS

United States Patent Office 3,418,677
Patented Dec. 31, 1968

3,418,677
WINDSHIELD WIPER CLOSURE CONTROL SYSTEM
William B. Goodale, Orchard Lake, Mich., assignor to Ford Motor Company, Dearborn, Mich., a corporation of Delaware
Filed Feb. 23, 1967, Ser. No. 618,194
9 Claims. (Cl. 15—250.19)

ABSTRACT OF THE DISCLOSURE

A control system operating a closure member concealing a motor vehicle windshield wiper in its depressed park position. The control system includes wiper position sensing means controlling the operation of valve means for directing fluid pressure to a closure member operating motor upon initial movement of the wiper from its parked position and terminating the application of pressure to the motor upon the return of the wiper to the parked position.

Background of the invention

Prior art teaches concealing motor vehicle windshield wipers beneath hinged closure members mounted on the vehicle cowl. In their depressed park positions, the windshield wipers are located in an enclosure below said closure members. Movement of these closure members from a closed position into an open position allowing the windshield wipers to move into contact with the vehicle window has been occasioned by various systems utilizing fluid or electric motors necessarily operable prior to the actuation of the vehicle windsheld wiper motor. These arrangements require a separate switch that must be actuated by the vehicle operator to open the closure members prior to the actuation of the windshield wiper actuation switch.

This invention provides a control system for a windshield wiper closure member that automatically urges the closure members into an open position upon the actuation of the windshield wiper motor. Also, upon the deactivation of the windshield wiper motor and the return of the windshield wpers to the depressed park position, the closure system of this invention automatically provides for the return of the closure members to their closed position.

Brief summary of the invention

A windshield wiper closure control system constructed in accordance with this invention is utlized in combination with a motor vehicle having a windshield, a windshield wiper having an operative condition and a depressed park condition and a substantially horizontal aperture closure member pivotally connected to the exterior of the vehicle and having an open and a closed position. The windshield wiper, in its depressed park condition, is located beneath said member. The control system includes pump means developing fluid pressure, first fluid motor means operatively connected to said wiper for moving a wiper from a depressed park condition to an operative condition and second fluid motor means operatively connected to a closure member for moving the latter from a closed position to an open position. Fluid conduit means interconnect the pump means and the first motor means. These conduit means include valve means having a first position admitting pressure from the pump means to the first motor means and a second position admitting pressure from the pump means to both the first and the second motor means. Control means operatively connected to the valve means senses the condition of the wiper and urges the valve means into the first position when the wiper is in the depressed park condition and urges the valve means into the second position when the wiper is in the operative condition.

Brief description of the drawings

FIGURE 3 is a sectional view taken along the line 3—3 of FIGURE 1, and illustrating schematically a fluid circuit included in the control system of this invention with parts illustrated at rest; and FIGURE 4 is a view similar to FIGURE 3 but illustrating the apparatus in its operative condition.

Detailed description of the invention

Figure 1:
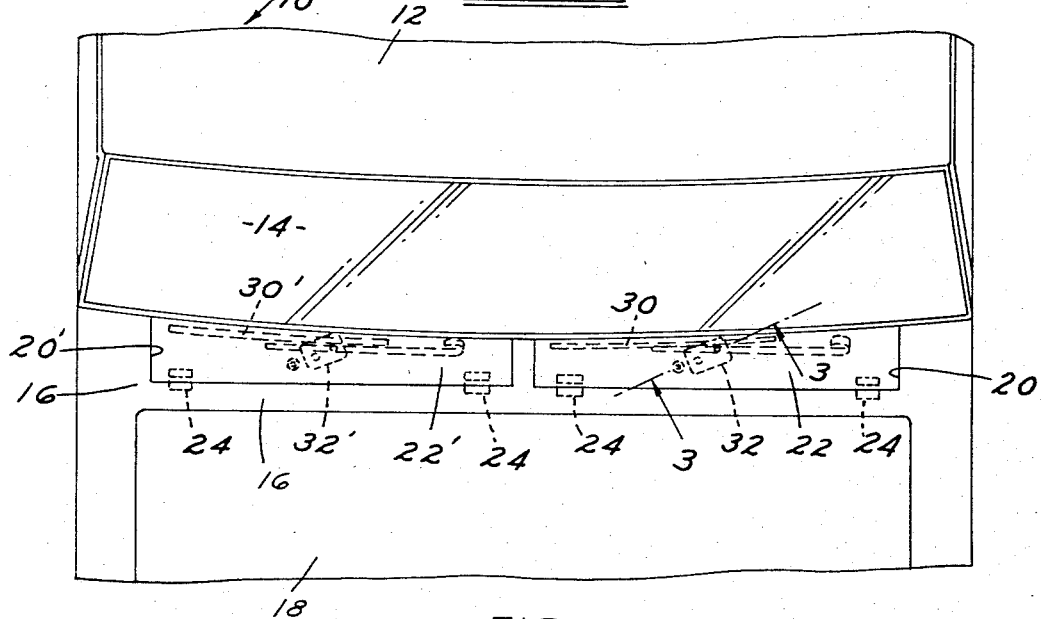
FIGURE 1 is a top view of a portion of a motor vehicle having a windshield wiper closure control system of this invention.
Figure 2:
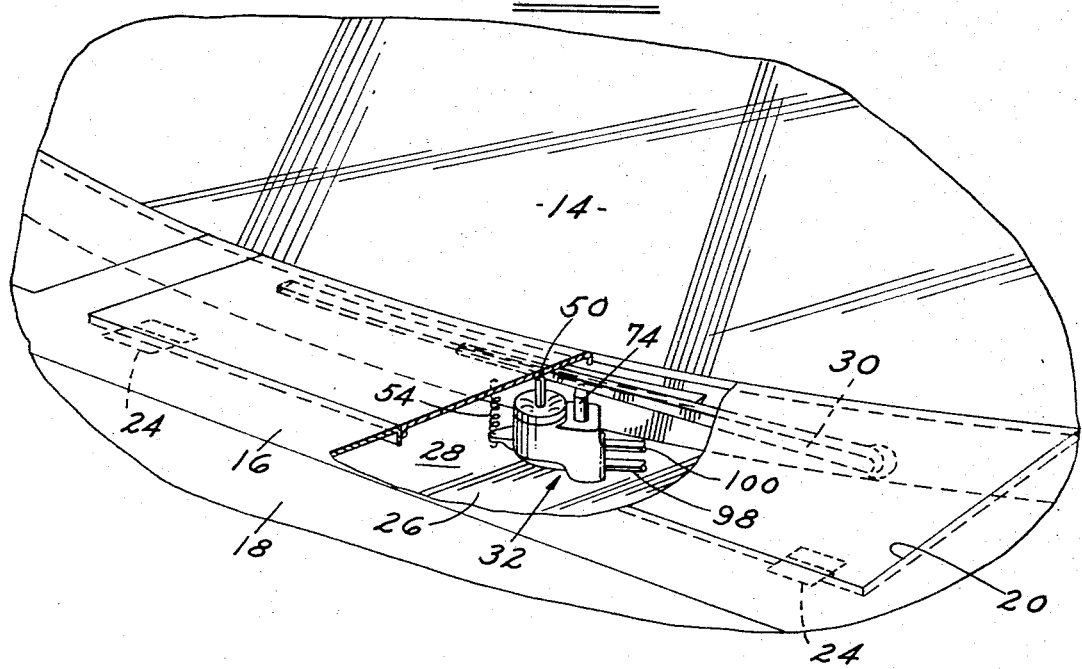
FIGURE 2 is an isometric view, having parts cut away, of a portion of a motor vehicle shown in FIGURE 1.

Referring now to the drawings, the numeral 10 denotes a motor vehicle having a roof panel 12, windshield 14, cowl 16 and hood panel 18. Proximate to windshield 14, apertures 20 and 20' are formed through cowl 16. Closure members 22 and 22' are located in apertures 20 and 20', respectively, and are pivotally secured to cowl 16 by means of hinges 24. As seen most clearly in FIGURE 2, a structural member 26 is located beneath and spaced from cowl 16 and closure members 22 and 22', thus defining an enclosure 28. Windshield wipers 30 and 30' are mounted on the vehicle body structure adjacent windshield 14 so that said wipers are located within enclosure 28 in their depressed park position. Control units 32 and 32' are located within enclosure 28 as will be described in greater detail below.

It should be understood that control units 32 and 32' are identical and that the following description of control unit 32 and its surrounding structure applies equally to control unit 32' and its surrounding structure.

Control unit 32 is mounted within enclosure 28 by means of an integrally formed threaded shaft extending from control unit 32 and through an aperture in structural member 26. A washer 36 and a threaded nut 38 cooperate to position and hold unit 32 as illustrated in FIGURES 3 and 4.

Control unit 32 includes a housing 40 having formed therein a fluid chamber 42, open at the top end thereof, and a valve chamber 44, open at both of its ends. A power piston 46 is slidably received in chamber 42 and has secured thereto a fluid seal 48. A rod 50 is mounted for movement with power piston 46 and extends vertically therefrom and contacts closure member 22. A dust and dirt boot 52, constructed of resilient material, surrounds rod 50 and closes the open end of chamber 42 against the intrusion of deleterious foreign matter.

A tension spring 54 has one end thereof secured to a shoulder 58 integrally formed on housing 40 and its other end secured to a tab 56 formed on closure member 22. It may thus be seen, due to the pivotal mounting of closure member 22, that the force exerted by spring 54 biases closure member 22 into a closed position that is substantially planar with cowl 16.

Located adjacent the end wall 60 of chamber 42 is a passageway 62 communicating between chamber 42 and an enlarged portion 64 of valve chamber 44. A passage 66 extends from enlarged portion 64 through the outside wall of housing 40. A passage 68 is spaced from passage 62 and communicates between chambers 42 and 44. A passage 70, diametrically opposed from passage 68, extends from chamber 44 through the outside wall of housing 40.

An elongated valve shaft 72 is positioned in chamber 44 and has formed on one end thereof an enlarged sensing finger 74 having a tapered end portion 74′. Finger 74 makes a sliding fit with housing 40. Valve shaft 72 has an enlarged portion or valve spool 76 integrally formed thereon and spaced from fingers 74. Valve spool 76 makes a sliding fit with housing 40. Fluid seals 78 and 78′ are mounted on shaft 72 to prevent the escape of pressurized fluid.

Located in chamber 44 and surrounding shaft 42 is a compression spring 82 that bears against the end wall 84 of chamber 44 and a shoulder 80 formed on shaft 72. A stop washer 86 is secured about the bottom end of shaft 72. It may thus be seen that the force exerted by spring 82 biases shaft 72 upwardly and that movement of shaft 72 in this direction will be terminated by contact between stop washer 86 and structural member 26 (FIGURE 4).

The preferred fluid circuit utilized in this invention is schematically illustrated as connected to control unit 32 in FIGURES 3 and 4 and includes a fluid pump 88 drawing fluid from reservoir 90 through conduit 92. Preferably, pump 88 is the pump utilized in conjunction with the vehicle power steering gear. This arrangement negates the necessity of providing a separate pump to operate the control system of this invention.

In such an arrangement, pump 88 is connected by fluid conduit 94 with power steering gear 96 and pressurized fluid thus proceeds from pump 88 through power steering gear 96 to passageway 66 by means of a conduit 98. Fluid exiting from control unit 32 via passageway 70 is carried by a conduit 100 to a fluid windshield wiper motor 102, mechanically connected to the vehicle windshield wiper 30 to motivate same. The fluid proceeds from motor 102 to fluid reservoir 90 by means of a conduit 104. Fluid flow through this circuit is represented by the arrows of FIGURES 3 and 4.

It is to be understood that control unit 32 may be utilized in a vehicle having a windshield wiper motor other than the fluid type. For instance, an electric motor could be used to operate wiper 30. In such an arrangement, fluid motor 102 would not be included in the fluid circuit described above.

The operation of the heretofore described apparatus is as follows:

FIGURE 3 illustrates the condition of control unit 32 when windshield wiper 30 is inoperable. As described above, closure member 22 is biased into the closed position by means of spring 54 and conceals wiper 30. Wiper 30, in its depressed park condition, rests against finger 74 of valve shaft 72 and the force exerted by wiper 30, being sufficient to overcome the force exerted by spring 82, urges shaft 72 into the retracted position illustrated.

When the operator of the motor vehicle actuates the windshield wiper switch in the vehicle passenger compartment, pressurized fluid proceeds from pump 88 through conduit 94, power steering gear 96, conduit 98 and into passageway 66. Since valve spool 76 is held at this time in enlarged portion 64 of chamber 44 due to the force of wiper 30, this fluid proceeds along chamber 44 and exits control unit 32 via passageway 70, proceeding via conduit 100 to motor 102. Power piston 46 remains stationary at this time since no effective pressure is transmitted thereto but rather is bled away from piston 46 along the length of chamber 44 and is admitted to motor 102. This pressure causes the actuation of motor 102 which, through its mechanical connection (not shown) with wiper 30, actuates the wiper. Wiper 30 thus moves in an upward direction away from finger 74 but does not contact closure member 22 due to the clearance present between finger 74 and closure member 22. This movement of wiper 30 allows the force exerted by spring 82 to force valve shaft 72 into the position illustrated in FIGURE 4. In this position, valve spool 76 blocks the restricted portion of passage 44, thus causing a momentary interruption in the operation of motor 102. The pressure exerted by pump 88 is now applied to power piston 46. This pressure now present in fluid champer 42 and bearing on power piston 46 forces the piston 46 in the upward direction into the position illustrated in FIGURE 4. Consequently, rod 50 slides upwardly against closure member 22 and exerts a force, sufficient to overcome the force of spring 54, urging closure member 22 into the open position.

As may be seen in FIGURE 4, when power piston 46 reaches this upward position, pressurized fluid in chamber 42 may exit said chamber by means of passageway 68 and proceed via passageway 70 and conduit 100 to motor 102, thus causing the motor to resume operation and causing wiper 30 to exit chamber 22 and begin normal windshield wiping motion on windshield 14. (It may thus be seen that power piston 46 acts as a valve member controlling flow of fluid through passageway 68.) Back pressure from motor 102 bears continuously at this time on piston 46, causing member 22 to be held in the open position.

When the vehicle operator moves the windshield wiper actuation switch in the vehicle passenger compartment to the off position, wiper 30 returns to the depressed park position illustrated in FIGURE 3. (Apparatus causing windshield wiper members to assume a depressed park position upon the termination of windshield wiping are well known in the art and no need is seen to herein detail the construction of such apparatus.) In the depressed park position, windshield wiper 30 again contacts sensing finger 74 and forces said finger and shaft 72 downwardly against the force of spring 82 into the position shown in FIGURE 3 wherein valve spool 76 is located in passage enlargement 64. Valve chamber 44 is once again open to longitudinal fluid flow. Since the termination of operation of motor 102 causes the elimination of back pressure in the fluid circuit upstream of said motor, pressure in fluid chamber 42, acting on power piston 46, is dissipated by bleeding fluid present in the chamber through passage 62, chamber 44, passage 70, conduit 100, motor 102, conduit 104 and into fluid reservoir 90. No force being applied to piston 46, the force exerted by spring 54 is sufficient to urge closure member 22 into its original closed position.

It may thus be seen that this invention provides a closure control system whereby a windshield wiper may be concealed in an aperture in a vehicle body structure by a closure member, said closure member being actuated automatically upon the actuation of a windshield wiper motor. No secondary switch controlling the movement of the closure member is required. Automatic retraction of the closure member into a closed position upon the deactuation of the windshield wiper motor is also accomplished.

It is to be understood that this invention is not limited to the exact construction shown and described, but that various changes and modifications may be made without departing from the spirit and scope of the invention as defined by the following claims.

What is claimed is:

1. In combination in a motor vehicle, body structure defining an enclosure, said body structure including a movable closure member having an open position and a closed position, a windshield wiper mounted to have a park position within said enclosure, first motor means for moving said wiper from its parked position, second motor means operatively connected to said closure member and actuatable to urge said closure member into the open position, motor actuation control means operatively connected to said second motor means and having a second motor means actuating position and a second motor means deactuating position, and wiper position sensing means coupled to said control means and urging said control means into second motor means actuating position when said wiper is out of its parked position and into second motor means deactuating position when said wiper is in the parked position.

2. The combination of claim 1, including resilient means secured to said closure member and biasing the latter towards the closed position.

3. The combination of claim 1, said second motor means comprising a fluid motor, a source of fluid under pressure, and fluid conduit means interconnecting said fluid motor and said fluid pressure source, said conduit means including said control means, said control means comprising a valve.

4. In combination in a motor vehicle, body structure defining an enclosure (said structure including a movable closure member having an open position and a closed position, a windshield wiper having a depressed park position within said enclosure and operable positions within and without said enclosure, pump means for developing fluid pressure, first pressure sensitive means operatively connected to said wiper for moving said wiper from said park position to said operable positions, second pressure sensitive means operatively connected to said member for moving said member from the closed position to the open position, conduit means interconnecting said pump means and said first and second pressure sensitive means, said conduit means including control means sensing the position of said wiper and admitting pressure to said second pressure sensitive means only when said wiper is in an operable position.

5. The combination of claim 4, including resilient means operatively connected to said structure and said closure member and urging the latter toward said closed position, said second pressure sensitive means comprising a fluid motor having a housing defining a chamber, a power piston slidable in said chamber, and an actuating rod secured for movement with said piston, said rod in contact with said member, the force exerted by said fluid motor being sufficient to overcome the force exerted by said resilient means to urge said member into the open position.

6. In the combination of claim 4, said first and second pressure sensitive means comprising first and second fluid motors, said control means comprising a valve having a first position defining a fluid passage between said pump means and said first fluid motor and a second position defining a fluid passage between said pump means and both of said fluid motors, resilient means exerting a force biasing said valve into said second position, and a sensing finger secured for movement to said valve, said wiper bearing on said sensing finger when said wiper is in said park position and exerting a force overcoming the force of said resilient means to urge said valve into said first position.

7. The combination of claim 6 wherein said valve has a third position defining a fluid passageway between said pump means and said second fluid motor, said third position being intermediate said first and second position.

8. In a motor vehicle having a windshield, a windshield wiper having an operative condition and a depressed park condition and a substantially horizontal aperture closure member pivotally connected to the exterior of the vehicle and having an open and a closed position, said wiper located beneath said member in its depressed park condition; a windshield wiper control system including: pump means developing fluid pressure; first fluid motor means operatively connected to said wiper for moving said wiper from the depressed park condition to the operative condition; second fluid motor means operatively connected to said member for moving said member from the closed position to the open condition; fluid conduit means interconnecting said pump means and said first motor means, said conduit means including valve means having a first position admitting said pressure to said first motor means and a second position admitting said pressure to both said first and second motor means; and control means operatively connected to said valve means and sensing the condition of said wiper and urging said valve means into the first position when said wiper is in the depressed park condition and into the second position when said wiper is in the operative condition.

9. The combination of claim 8, including resilient means urging said member into the closed position, the force exerted by said resilient means being less than the force exerted by said second motor means.

References Cited

UNITED STATES PATENTS

| | | | |
|---|---|---|---|
| 2,936,477 | 5/1960 | Feller | 15—250.19 |
| 3,120,673 | 2/1964 | Buchwald | 15—250.19 X |
| 3,121,902 | 2/1964 | Massoll | 15—250.19 X |
| 3,225,376 | 12/1965 | Heiler | 15—250.19 |
| 3,226,756 | 1/1966 | Heiler | 15—250.19 |
| 3,290,715 | 12/1966 | Heiler | 15—250.19 |
| 3,314,195 | 4/1967 | Ziegler | 15—250.19 X |

PETER FELDMAN, *Primary Examiner.*

U.S. Cl. X.R.

49—349; 60—52